Sept. 6, 1960   R. J. REID   2,951,371
HOLDER FOR FORCE SENSING DEVICE
Filed Aug. 6, 1956
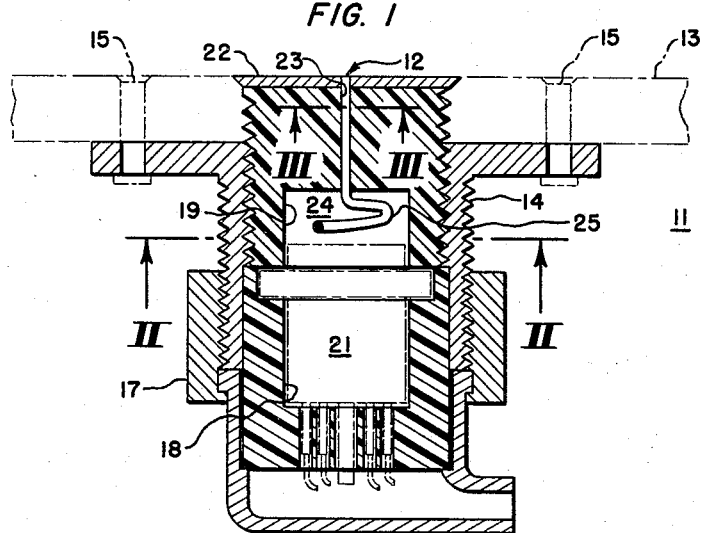
FIG. 1
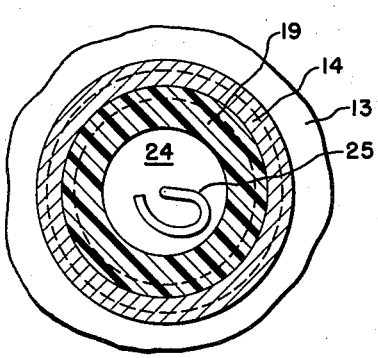
FIG. 2
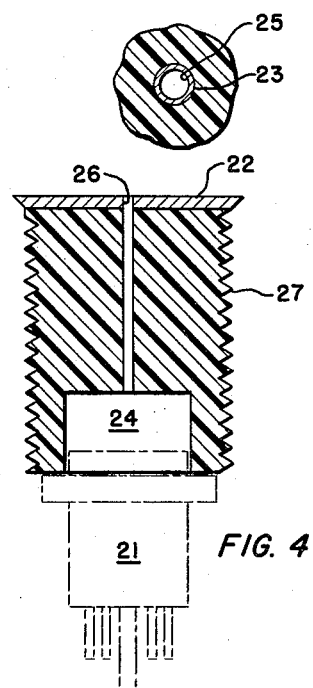
FIG. 3
FIG. 4
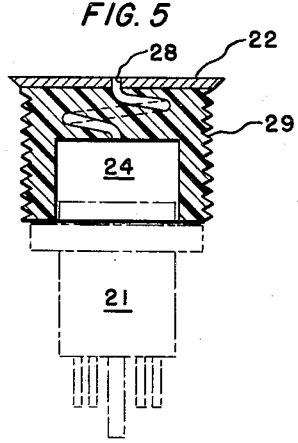
FIG. 5
INVENTOR.
ROBERT J. REID
BY
*Walter J. Jaton*
ATTORNEY

United States Patent Office 2,951,371
Patented Sept. 6, 1960

2,951,371

HOLDER FOR FORCE SENSING DEVICE

Robert J. Reid, El Cajon, Calif., assignor to General Dynamics Corporation, San Diego, Calif., a corporation of Delaware Filed Aug. 6, 1956, Ser. No. 602,268

3 Claims. (Cl. 73—431)

The present invention relates generally to holders for force sensing devices and more particularly to a holder of this type which embodies attenuating means for protecting the force sensing device from the undesirable effects of harmonic oscillating forces.

It is frequently of great importance, as in the development and testing of aircraft, to accurately determine the existence, magnitude, and other characteristics of those environmental elements which may be acting upon a surface. However, such environmental elements frequently manifest themselves in the form of harmonic oscillating forces, and it will be apparent that the effect of such harmonic forces will often be to destroy the accuracy of response of the force sensing device by virtue of the tendency of such forces to excite resonance in the sensing device. The fluctuating response of a resonating transducer undesirably acts to mask the actual magnitude of the forces desired to be measured, and the overall response is poor and erratic, as compared to the essentially linear response of the transducer at frequencies within its design range. Further, it is to be noted that the low damping and high amplification inherent in many transducers in such that even low amplitude excitation at critical frequencies may so greatly disturb the delicate transducer components that the transducer will be destroyed.

This problem of harmonic resonance has become particularly acute in the testing of high speed aircraft because of the considerable number of pressure transducer devices which are often employed to sense the fluid or air pressures acting upon the skin of the aircraft. It has been found that the high speed airstream to which these transducers are frequently exposed has produced oscillating pressures of a frequency and amplitude which are sometimes destructive to the transducers and productive of misleading transducer indications. By way of example, reference is made to that form of flush mounted holder and recessed transducer arrangement disclosed in a copending application in the name of Charles B. Walker, Serial No. 497,765, filed on March 29, 1955, now Patent No. 2,822,690, entitled "Holder For Force Sensitive Element," and assigned to the assignee of this invention.

The transducer holder disclosed in the aforesaid copending application is adapted for securement, for example, to the surface or skin of an aircraft wing the surface pressures of which are to be measured. The transducer is housed and supported within the holder and is recessed to reduce dynamic temperature effects. Disposed in spaced relation above the transducer is a cap-like cover which is flush with the outer surface of the aircraft wing and which embodies a central opening communicating with the cavity or space formed between the cover and the transducer. It is through this opening and cavity that the oscillating pressure forces to be measured are admitted. In the employment of this transducer and holder arrangement during certain test conditions, it was found that the oscillating pressure forces being measured were sometimes masked by the superimposition thereon of irregular transducer output induced by higher frequency oscillating pressure forces beyond the range of interest. The irregular output or response of the transducer at its natural resonant frequency made it necessary that some means be provided to afford a low-pass filter characteristic. That is to say, a means was needed for permitting the relatively low frequency signals or pressure oscillations to act upon the transducer unchanged, while attenuating the higher frequency pressure signals that were not of interest, whereby the transducer would be protected against the undesirable effects of resonance which might otherwise be induced by such higher frequencies or their harmonics.

Accordingly, the present invention comprises the combination of a tube or pipe in communication with means forming a cavity adjacent the transducer, the pipe preferably being compactly housed or carried within a removable cap or cover of the transducer holder, with the dimensions of the pipe and cavity being predetermined to provide a flat frequency response over the design frequency range of the transducer, which will be specifically described hereinafter. It is noted that the present invention is related to the abovesaid copending application, in that the attenuating means hereof are particularly well-suited for association with the transducer holder of that application. However, it is to be understood, of course, that the present invention is not to be limited to the arrangement of such application, but instead is to be considered as readily adapted for use in association with a wide variety of force sensing devices where it is desired that such devices, and the readings they generate, be protected from the undesirable effects of harmonic oscillating forces.

It is therefore an object of the present invention to provide unique attenuating means adapted for association with a force sensing device for protecting such device from the undesirable effects of oscillating forces.

Another object of the invention is the provision of a novel holder for a force sensing device, which holder embodies filter means for shielding said device from the undesirable effects of harmonic oscillatory forces.

An additional object of the invention is to provide an improved cap for a holder for a force sensing device, which holder cap includes attenuating means compactly and simply mounted in the holder cap for protecting the force sensing device in the holder from oscillatory forces tending to excite the sensing device at its resonant frequency.

A further object of the invention is the provision of novel attenuating means adapted for accepting and passing harmonic oscillatory forces, up to a certain frequency, to a pressure transducer and attenuating such forces beyond that frequency to thereby prevent damage to the transducer.

Another object of the invention is to provide an improved attenuating means in combination with a recessed transducer which is adapted for measuring pressures upon a surface, which attenuating means occupies a minimum space between the transducer and such surface and is readily removable to permit access to the transducer from the surface.

A further object of the invention is to provide a novel low-pass filter means, that is, means for attenuating oscillating pressure forces above a certain frequency, which means is interposed in a minimum space between the surface upon which such pressure forces are acting and the pressure transducer which is employed to sense such forces.

Another object of the invention is to provide a novel pressure gauge holder which embodies attenuating means and which is simple and easy to install, and inexpensive to manufacture.

Other objects and features of the present invention will be readily apparent to those skilled in the art from the following specification and appended drawings wherein are illustrated preferred forms of the invention, and in which:

Figure 1 is an elevational view, partially in cross section, of a holder and attenuating means illustrated in association with the skin of an aircraft wing;

Figure 2 is a view taken along II—II of Figure 1;

Figure 3 is a view, on an enlarged scale, taken along III—III of Figure 1;

Figure 4 is an elevational view in cross section of another embodiment of a holder and attenuating means, portions thereof being omitted for clarity; and Figure 5 is an elevational view in cross section of still another embodiment of a holder and attenuating means, portions thereof being omitted for clarity.

Referring to the drawings and more particularly to Figures 1, 2 and 3, there is illustrated an embodiment of a holder 11 and an attenuating means 12 in accordance with the present invention, holder 11 being broadly of the type disclosed in the above-said copending application, Serial No. 497,765. Components 11 and 12 are illustrated in association with an outer skin 13 of an airplane wing (not shown) to demonstrate a typical application for the present invention.

Holder 11 comprises, generally, an open-ended upper receptacle 14; which is secured to the underside of skin 13 by usual flush rivets 15; a hollow lower receptacle 16; a nut 17, which serves to secure together receptacles 14 and 16; an inner sleeve member 18 closely fitted within receptacles 14 and 16; and an upper closing, or cap member 19 which is threadably disposed within and projects somewhat above upper receptacle 14 through an opening in skin 13 into flush relationship with the exterior surface of skin 13 as illustrated.

Members 18 and 19 are made of suitable insulating material such as the well-known Micarta material, and are adapted to receive or house a conventional pressure transducer 21, which is indicated in phantom outline, it being noted that both cap member 19 and transducer 21 are removable from above. Cap member 19 embodies at its upper surface a disk 22, preferably metallic, which is rigidly secured in position by suitable adhesives or the like, and adapted for flush relationship with the exterior surface of skin 13. A central opening or passage 23 is provided through cap member 19 and disk 22 thereof, whereby communication is afforded between the exterior of skin 13 and a chamber or cavity 24 formed by cap member 19 and the upper surface or diaphragm portion of transducer 21.

Transducer 21 may be of the type described and shown, for example, in U.S. Patent No. 2,636,964, issued to Joseph H. Lancor, Jr., et al., April 28, 1953, which transducer type embodies a Wheatstone bridge arrangement of fine wires whose response to a force or pressure upon the transducer diaphragm is such that their electrical resistivity is altered in proportion to the applied pressure. This effects an electrical unbalance in the bridge circuit which is manifested in readily measurable changes in the balance voltage relationship, the changes being conventionally calibrated in terms of pressure units. With this construction, comparatively small forces, such as the air pressures acting against skin 13 and passing through cap member 19, may be sensed by transducer 21, all as is more particularly described in the above-said patent application, Serial No. 497,765.

Generally, transducers such as pressure transducer 21 show low damping at their resonant frequency, and oscillating air pressures acting upon skin 13 are often capable of exciting transducer 21 at its resonant frequency to an extent sufficient to spoil or mask the pressure readings sought and sometimes also sufficient to destroy the transducer, as for example by dislodging the delicate Wheatstone bridge arrangement thereof. To prevent this, attenuating apparatus or means 12 is provided.

Attenuating means 12 comprises an opening or passage 23 in cap member 19, passage 23 having a particular diameter and length, in combination with a cavity 24 of a particular volume, the particular dimensions of the passage and cavity being readily determined by experimentation and calculation in accordance with well-known principles of acoustics. As will be apparent to those skilled in the art the volume of cavity 24 is a more important factor than the shape of cavity 24, since it has been found that the resonant frequencies of cavities having the same opening and volume but having different shapes are substantially identical where the linear dimensions of the cavity are considerably less than a quarter wave length and the opening is not very large. This is the case here since the diameter of cavity 24 is conveniently the same as the upper surface or diaphragm of transducer 21, and the size of transducer 21 is usually in the order of less than an inch. Of course, it is contemplated that if the transducer were considerably larger, and the shape of cavity 24 became important, the diameter and length of passage 23 would be altered to provide the attenuation desired. Further, when selection of an appropriate volume for cavity 24 is discussed herein, it is of course meant that the inner structure defining cavity 24 would be altered to provide such an appropriate or desired volume.

The adjustment of the dimensions of an acoustical damping system, such as passage 23 and cavity 24, to achieve a desired resonance at some critical frequency is well-known to those skilled in the art, being somewhat analogous to the adjustment of the inductance, capacitance, and resistance of an electrical circuit. In substantially the same way that these circuit factors are adjusted to produce a resonant electrical circuit, the inertance, compliance and resistance of attenuating means 12 are adjusted to effect a resonant condition; the inertance being represented by the inertia of the fluid mass in passage 23 moving in phase in response to the oscillating pressure forces; the compliance being represented by the enclosed volume of cavity 24; and the resistance being represented by the dissipation of pressure energy, by resistance to flow of the air in passage 23. Since a minimum space for attenuating means 12 is a desideratum, a size of passage 23 and volume of cavity 24 should be selected which will achieve the desired resonance, having due regard for the viscosity and density of the air. In this connection, it is noted that the present invention is adapted to effect an overall reduction of the space occupied by the member containing a passage 23 of the desired length, such reduction being effected through a convolution of passage 23 or through the use of a convoluted tube or pipe 25 which is tightly disposed within passage 23, flush with the upper surface of disk 22. Such a tube 25 acts in combination with the cavity 24 for attenuating purposes, and is made to extend into and coil within cavity 24, as illustrated, tube 25 being of any suitable shape or configuration which will permit it to be fitted within the available space.

Figure 4 illustrates the comparative length of a straight passage 26 which would have to be provided to produce an effect equivalent to that of coiled pipe or tube 25, and concomitantly the greater height or size of cap member 27, corresponding to cap member 19 of Figure 1, which would be necessary will be evident. Thus, the recognition that tube 25 may be convoluted or coiled as described, and the employment of such a construction, provides a novel attenuating system which is both compact and light in weight. However, it is noted that where space is not a consideration the shaped tube may be omitted and reliance placed on a passage alone through the cap, with the passage, of course being of the desired length.

Figure 5 illustrates a variation of the present invention in which a coiled tube 28 is provided in integral fashion within the upper portion of a cap member 29. In this latter embodiment, cap member 29 may be made of any suitable plastic insulating material, such as one of the well-known casting resins, whereby pipe 28 may be integrally formed during the casting or fabrication of cap member 29. A sturdy, vibration resistant mounting of pipe 28 within member 29 is thus provided.

It will be apparent from the description hereinabove made that a novel attenuating means and holder for a force sensing device have been provided which are effective to pass harmonic oscillating forces in a desired range while attenuating harmonic oscillating forces beyond such range, thereby preventing any masking of desired readings and possible injury to the sensing device. The system acts on the order of a low-pass filter in its preferred embodiments, and is adapted to fit within a minimum space, being particularly well-suited for use in connection with flush type transducer mountings, as above described, wherein it is externally accessible.

While certain preferred embodiments of the invention have been specificaly disclosed, it is understood that the invention is not limited thereto as many variations will be readily apparent to those skilled in the art and the invention is to be given its broadest possible interpretation within the terms of the following claims.

What I claim is:

1. A pressure transducer holder adapted to be mounted adjacent the interior of a member against whose exterior surface act oscillating pressure forces which it is desired to measure, said holder comprising receptacle means housing in position a pressure transducer having a sensing element, insulating means comprising a generally cup-shaped member and an insulating cap structure removably secured to said receptacle means and adapted to be flush mounted with the exterior surface of said member, said cap structure cooperating with said receptacle means to enclose said sensing element to substantially insulate said element against rapid fluctuations in environmental temperatures which may act upon said holder, said cap structure, said cup shaped member and said pressure transducer defining a cavity of predetermined volume, one side of said cavity being formed by the sensing element of said pressure transducer and the opposite side by said cap, said cap structure having a convoluted passageway therethrough of length greater than the thickness of said cap, said passageway being of predetermined cross section and length to effect fluid coupling between said cavity and the exterior of said member, said cavity and said passageway forming a low pass acoustical filter to attenuate harmonic oscillating pressure forces within a predetermined frequency range acting upon the exterior surface of said member while passing lower frequencies unchanged.

2. In a holder for supporting and housing a force sensing device having a certain natural resonant frequency, a low pass acoustical filter comprising means adapted to form with said force sensing device a cavity of predetermined volume, said means being open at one end, a removable element closing the open end of said means, said element having a passage therethrough, and a tube of predetermined cross section and length disposed through said passage and within said cavity and convoluted to fit within a minimum space for fluid coupling said cavity and the exterior of said holder to attenuate high frequencies tending to resonate said force sensing device while passing lower frequencies unchanged.

3. In a holder for supporting and housing a pressure transducer adjacent an opening in a surface against which fluid pressure forces may act, said transducer having a certain natural resonant frequency, a low pass acoustical filter comprising an element interposed between said surface and said transducer and forming therewith a cavity of predetermined volume, said element being flush mounted with said surface and having a passage therethrough, and a tube of predetermied cross section and length disposed through said passage for fluid coupling said cavity and the exterior of said surface to attenuate high frequencies tending to resonate said transducer while passing lower frequencies unchanged, the distance between said surface and said transducer being less than the length of said tube, said tube being convoluted to fit therebetween.

References Cited in the file of this patent

UNITED STATES PATENTS

| | | |
|---|---|---|
| 1,143,639 | Loomis | June 22, 1915 |
| 2,069,242 | Graham | Feb. 2, 1937 |
| 2,275,719 | Bevins | Mar. 10, 1942 |
| 2,325,117 | Faley | July 27, 1943 |
| 2,347,903 | Gluck et al. | May 2, 1944 |
| 2,729,730 | Brady | Jan. 3, 1956 |
| 2,784,593 | Peucker | Mar. 12, 1957 |
| 2,822,690 | Walker | Feb. 11, 1958 |